United States Patent [19]
Nagashima

[11] Patent Number: 5,287,763
[45] Date of Patent: Feb. 22, 1994

[54] TILT TYPE STEERING SYSTEM

[75] Inventor: Toshiyuki Nagashima, Maebashi, Japan

[73] Assignee: NSK Ltd., Tokyo, Japan

[21] Appl. No.: 941,321

[22] Filed: Sep. 4, 1992

[30] Foreign Application Priority Data

Sep. 6, 1991 [JP] Japan ................ 3-79790[U]

[51] Int. Cl.$^5$ .................................... B62D 1/18
[52] U.S. Cl. .................................... 74/493; 74/531; 411/2
[58] Field of Search ............ 74/493, 531; 280/775; 411/2, 5

[56] References Cited

U.S. PATENT DOCUMENTS

| | | | |
|---|---|---|---|
| 3,498,174 | 3/1970 | Schuster et al. | 411/5 |
| 3,785,671 | 1/1974 | Salewsky | 280/87 |
| 3,937,121 | 2/1976 | Schubert | 85/61 |
| 4,225,165 | 9/1980 | Kesselman | 292/256 |
| 4,330,139 | 5/1982 | Katayama | 280/777 |
| 4,502,825 | 3/1985 | Yamada | 411/5 |
| 4,658,610 | 4/1987 | Weber | 70/252 |
| 4,901,592 | 2/1990 | Ito et al. | 74/492 |
| 5,052,240 | 10/1991 | Miyoshi et al. | 74/493 |

FOREIGN PATENT DOCUMENTS

| | | | |
|---|---|---|---|
| 54-113751 | 9/1979 | Japan | 411/2 |
| 61-199472 | 12/1986 | Japan | . |
| 2-3972 | 1/1990 | Japan | . |

*Primary Examiner*—Allan D. Herrmann
*Attorney, Agent, or Firm*—Shapiro and Shapiro

[57] ABSTRACT

Disclosed is a tilt type steering system having: a steering column having its one end part into which a handle shaft fixed with a steering wheel is rotatably inserted; a pivotal supporting unit for pivotally supported the other end part of the steering column; an adjusting unit for adjusably locating and releasably fixing the steering wheel in an arbitrary position with respect to the car body within the range of pivotal movement of the steering column; a tilt lever for controlling the fixation and the release of the steering column with respect to the car body by the adjusting unit; and a shearing bolt having a head part sheared off when undergoing predetermined or greater torque in order to fix the tilt lever to the adjusting unit.

1 Claim, 3 Drawing Sheets

TILT TYPE STEERING SYSTEM

BACKGROUND OF THE INVENTION

1. Field of the Invention

The present invention relates to a tilt type steering system utilized for adjusting a height position of a steering wheel to match with a physique of the driver.

2. Related Background Art

As disclosed in, e.g., Japanese Utility Model Laid-Open Application Nos. 61-199472 and 2-3972 (corresponding to U.S. Pat. No. 4,901,592), a conventionally known system called a tile type steering wheel so that the height of the steering wheel is variable in accordance with a physique of the driver and a driving posture.

The known tilt type steering system is, as illustrated in FIGS. 1 and 2, constructed such that a steering wheel 1 is fixed to an upper end (rear end) of a steering shaft 2 which rotates in a torsional direction by operating this steering wheel 1; the steering shaft is inserted into a steering column 3; upper and lower (front and rear) ends of the steering column 3 are supported by corresponding portions of a car body B; and the vertical position of the upper support member on the upper side (rear side) is made freely adjustable.

The steering column 3 is constructed by combining a small-diameter inner column 4 with a larger-diameter outer column 5 in series. The outer column 5 makes a displacement with respect to the inner column 4 only when a strong force acting in an axial direction is exerted on the steering column 3, whereby an entire length of the steering column 3 is shortened.

The lower end (front end) of the above-described steering column 3 is pivotally supported on the car body through a horizontal shaft 6. On the other hand, a fixed bracket 7 fixed to the car body (on the lower side of a dash board) has side portions 7a, 7b formed with slits 8, 8 each assuming a circular arc configuration in vertical directions, with the horizontal shaft being centered At the upper part of the steering column 3, a lift bracket 9 is fixed to a portion sandwiched in this fixed bracket 7. A single piece adjust bolt 11 is inserted into the slits 8, 8 as well as into elongate U-shaped notches 10, 10 formed in sides 9a, 9b of lift bracket 9 and opened at the rear edge of the lift bracket 9. This adjust bolt 11 is also inserted within of a bridging pipe provided to span the space between two side walls of the lift bracket 9 so as not to shrink a gap between the two side walls when, as will be mentioned later, tightly fastening the adjust bolt 11 and an adjust nut 14.

Flat members 13 parallel with each other and defined as a rotation preventing mechanism are formed at a head part 12 provided at the proximal end (right end in FIG. 2) of adjust bolt 11. Simultaneously, flat member 13 engages with a side edge of one slit 8 (right side in FIG. 2), thereby preventing the rotation of the adjust bolt 11. Then, the adjust nut 14 is screwed to a part protruded from the outer surface of the fixed bracket 7 at the tip of the adjust bolt 11. At the same time, the proximal end of a tilt lever 15 is connectively fixed to this adjust nut 14. The adjust nut 14 screwed to the adjust bolt 11 is freely fastened and released from fastening by manipulating this tilt lever 15.

By the above construction, by manipulating the tilt lever to release (loosen) the adjust nut 14, it becomes possible to move the adjust bolt 11 along the slits 8, 8 of the fixed bracket 7 so as to adjust the position of the steering column 3, and thus the height of the steering wheel 1. Thereafter, the adjust nut 14 screwed to adjust bolt 11 can be fastened by means of the tile lever 15 to fix the steering column with the steering wheel at the desired height.

For example, the adjust nut 14 may be tightly fastened in such a state that the adjust bolt 11 is moved up to the upper ends of the slits 8, 8, resulting in a state where the steering wheel 1 is raised. The adjust nut 14 may also be tightly fastened in such a state that the adjust bolt is moved to the lower ends of the slits 8, 8, resulting in a state where the steering wheel 1 is lowered.

In the tilt type steering system constructed and functioning in the way described above, for the purpose of not only connectively fixing the proximal end of the tilt lever 15 to the adjust nut 14 but also causing, as will be stated later, no fluctuation in release load of the lift bracket 9, it is required that these two members 15, 14 be inseparable.

The reason for this is that it is necessary to maintain a force for clenching the fixed bracket 7 and the lift bracket 9 between adjust nut 14 and the head part 12 of the adjust bolt 11 at a designed value, when the adjust nut 14 is tightly fastened by the tilt lever 15 to fix a height position of the steering wheel 1.

If the tilt lever 15 and the adjust nut 14 are disassembled and reassembled, a positional relation between the two members 15, 14 changes. This can change the force by which the adjust nut 14 and the head part 12 clench the fixed bracket 7 and the lift bracket 9 when the tilt lever is manipulated to tighten the adjust nut 14.

If this force is too small, the function to hold the steering wheel 1 in the predetermined height position becomes impaired. Whereas if too large, in the event of an accident of collision, there is a possibility of increasing an impact exerted on the body of the driver when colliding with the steering wheel 1 in a construction of the type in which the lift bracket 9 releases, as will now be explained.

In the event of an accident, subsequently to a so-called primary collision in which the automobile collides with other automobiles, there occurs a so-called secondary collision in which the driver's body collides with the steering wheel 1. On the occasion of the secondary collision, for relieving the impact exerted on the driver's body, as disclosed in, e.g., Japanese Utility Model Laid-Open Application No. 2-3972, there is adopted a so-called collapsible structure in which the entire length of the steering, column 3 is shortened when an intense impact force is exerted in the axial direction. It is simultaneously practiced that the lift bracket 9 fixed to this steering column 3 is so supported inwardly of the fixed bracket 7 fixed to the car body as to be releasable when receiving the intense impact force.

When such an impact absorbing structure is taken, it is required that the lift bracket 9 be releasable from the interior of the fixed bracket 7 on the basis of a predetermined impact force. If the above-described force, increases due to the disassembly and the reassembly of the adjust nut 14 and the tilt lever 15, however, even when the predetermined impact force is applied to the steering wheel 1, the lift bracket 9 won't release from the fixed bracket 7, and it follows that the large impact is exerted on the driver's body because of the secondary collision.

For this reason, a magnitude of the force explained above in the case of rotating the tilt lever 15 up to the predetermined position has hitherto been adjusted in the factory. Simultaneously, as depicted in FIG. 2, the adjust nut 14 is welded to the tilt lever 15, thus, making the two members 14, 15 inseparable. Alternatively, a part of the adjust nut 14 is plastically deformed, thus making the two members 14, 15 inseparable.

However, the operation to weld the adjust nut 14 and the tilt lever 15 is troublesome. Further, the partial plastic deformation of the adjust nut 14 requires a dedicated equipment, and so on. In any case, those operations unfavorably cause an increment in the manufacturing costs of the tilt type steering system.

SUMMARY OF THE INVENTION

It is a general object of the present invention to obviate the inconveniences described above in a tilt type steering system.

According to one aspect of the present invention, there is provided a tilt type steering system, as in the same way with the above-described conventional tilt type steering system, comprising: a steering column into which a handle shaft fixed with a steering wheel at its rear end is rotatably inserted; a pivotal supporting unit for pivotally supporting the front end of the steering column on a horizontal pivot axis; a lift bracket fixed to a mid-part of the steering column; notches formed in this lift bracket and opened at the rear edge of the lift bracket; an adjust bolt inserted into the notches in the horizontal direction; a fixed bracket fixed to a car body in a state where the lift bracket is clenched bilaterally; slits so formed in the fixed bracket as to extend in the vertical direction and admitting penetrations of two end parts of the adjust bolt; an adjust nut screwed to the tip of the adjust bolt; a tilt lever having its proximal end fixed to one member, i.e., this adjust nut or the adjust bolt; and a rotation preventive mechanism, interposed between the other member, i.e., the adjust nut or the adjust bolt and the slits, for preventing rotations of the other member, characterized in that the adjust bolt moves along the slits to thereby raise and lower the rear end of the steering column.

Moreover, the tilt type steering system according to the present invention is characterized in that a shearing bolt having a head part sheared off when undergoing predetermined or greater torque is used for fixing the tilt lever to one member described above.

In the thus constructed tilt type steering system of this invention, the operation itself when adjusting a height position of the steering wheel in accordance with a physique, etc. of the driver is the same as that of the prior art tilt type steering system described above.

Particularly in the tilt type steering system of the present invention, the shearing bolt is employed for fixing the proximal end of the tilt lever to one member, the adjust nut or the adjust bolt. Therefore, when fixing this tilt lever to one member, the head part of this shearing bolt is sheared off and removed, thereby making one member and the tilt lever inseparable.

As a result of this, it is impossible to deassemble and reassemble one member and the tilt lever afterwards. Prevented is a change in the holding force of the lift bracket with respect to the fixed bracket.

BRIEF DESCRIPTION OF THE DRAWINGS

Other objects and advantages of the present invention will become apparent during the following discussion taken in conjunction with the accompanying drawings, in which.

DESCRIPTION OF THE PREFERRED EMBODIMENTS

Figure 1:
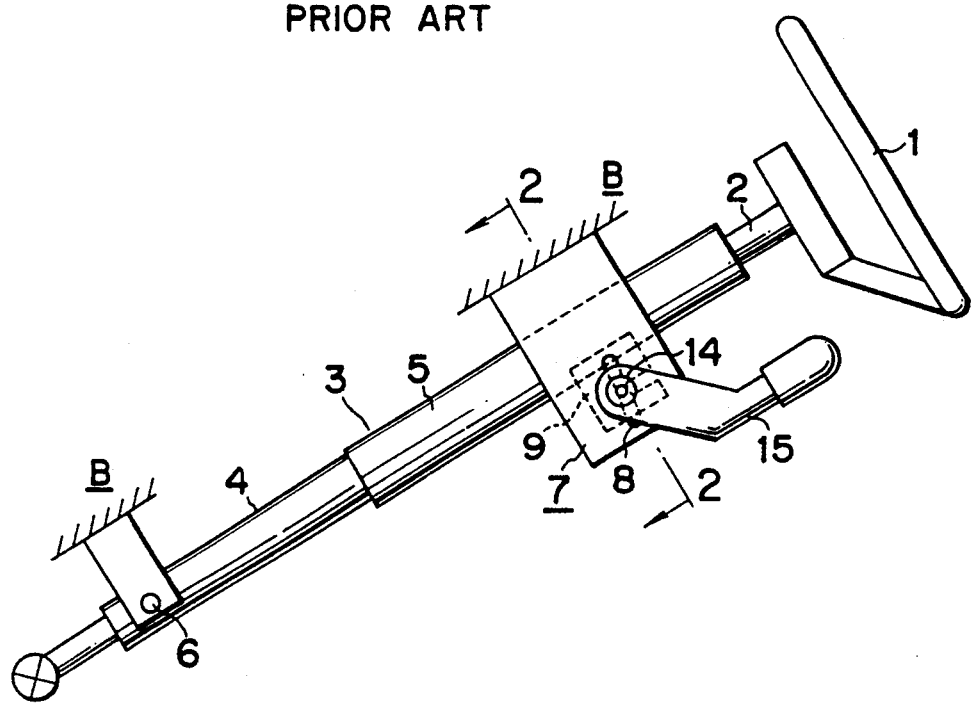
FIG. 1 is a side elevation showing one example of a tilt type steering system at which the present invention aims.
Figure 2:
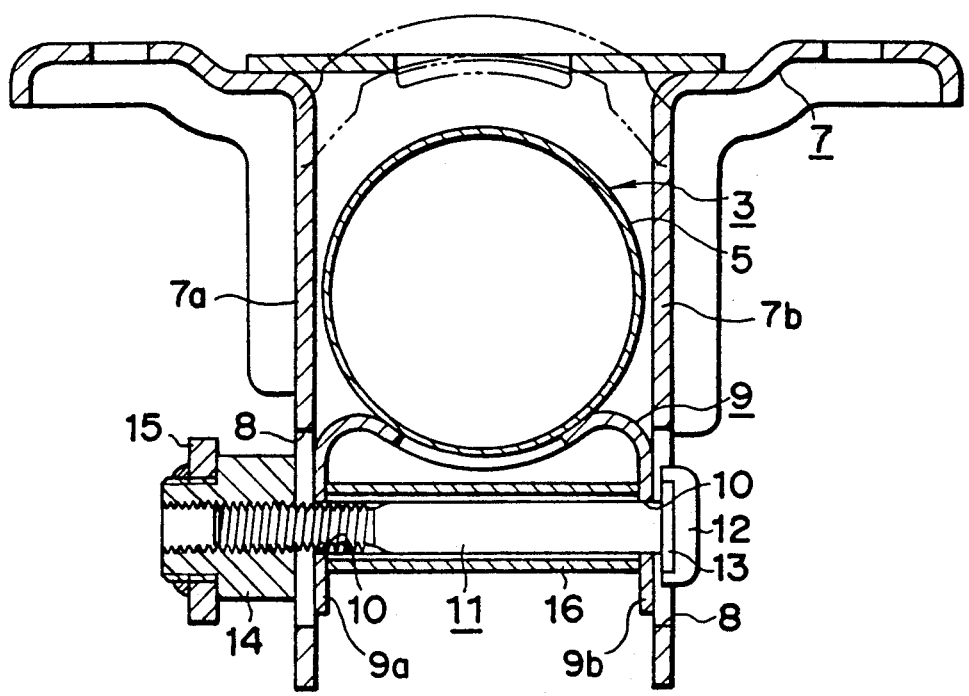
FIG. 2 is a sectional view taken substantially along the line 2—2 of FIG. 1.
Figure 3:
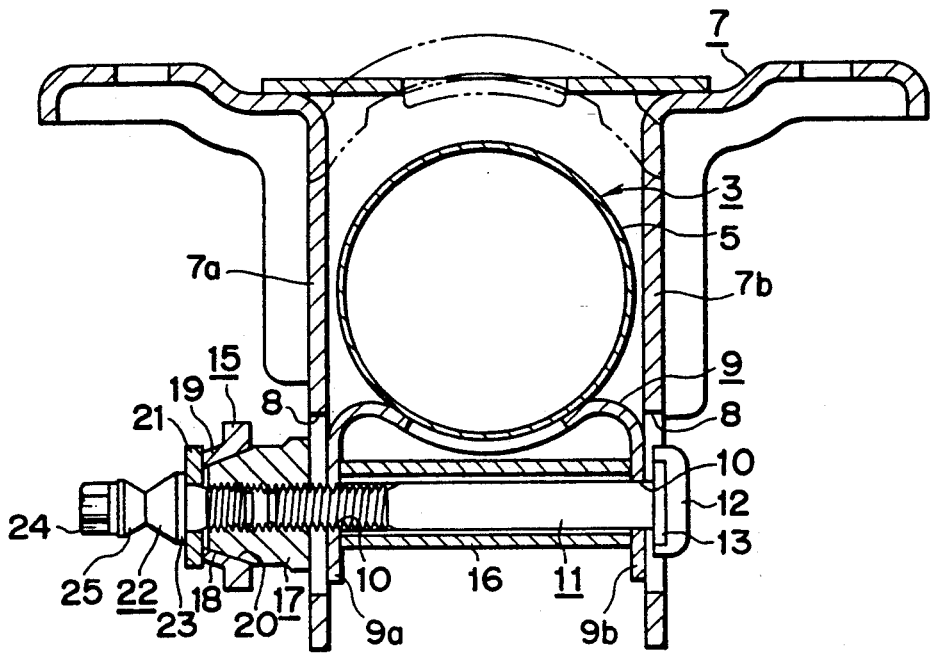
FIG. 3 is a sectional view similar to FIG. 2, showing a state where shearing of a shearing bolt is not yet effected in the first embodiment of the present invention.
Figure 4:
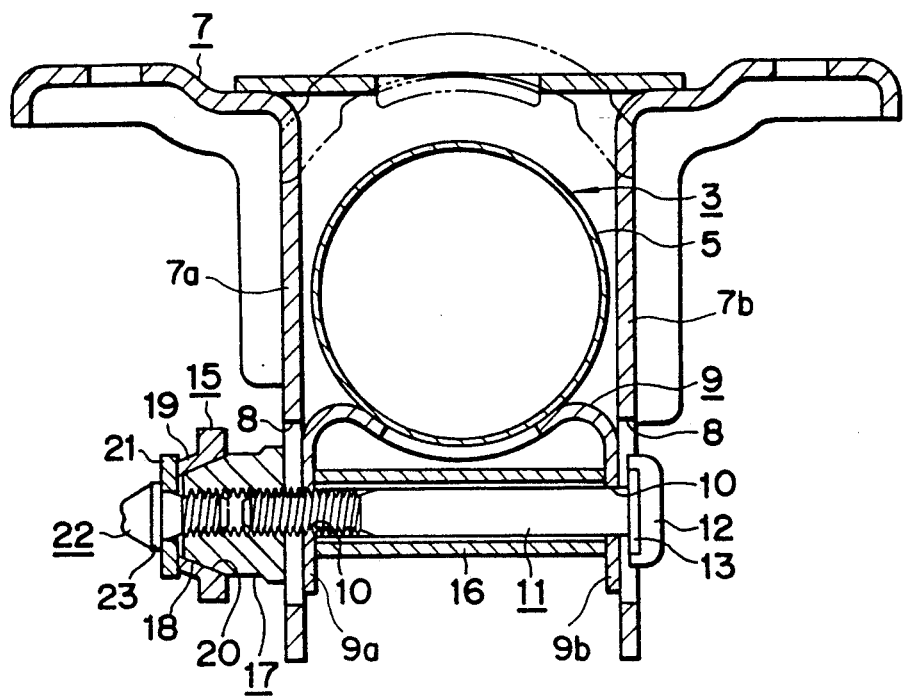
FIG. 4 is another similar view, showing likewise a state where the shearing the shearing bolt has been effected.

FIGS. 3 through 4 demonstrate the first embodiment of a tilt type steering system according to the present invention. Note that the tilt type steering system of this invention is characterized by a structure of a portion for connecting an adjust nut (in this embodiment) to a tilt lever. Other portions have the same structures as those in the prior art, and therefore the repetitive explanations will be omitted by putting the like symbols on the portions structured in the same way with the prior art. The characteristic portion of the present invention will hereinafter be described.

An inclined surface 18 assuming a conical surface configuration is formed on an outer peripheral surface of an outer end (left end in FIGS. 3 and 4) of an adjust nut 17 screwed to a tip of an adjust bolt 11. On the other hand, a short cylindrical member 19 is formed at the proximal end of a tilt lever 15. An inner peripheral surface 20 of this short cylindrical member 19 is shaped in the form of a conical recessed surface which closely contacts the inclined surface 18.

When connecting the tilt lever 15 to the adjust nut 17, a seat plate 21 impinges on the outer end surface of the adjust nut 17 in a state where the short cylindrical member 19 is externally fitted to the inclined surface 18. Further, the tip (right end on FIGS. 3 and 4) of a shearing bolt 22 penetrating this seat plate 21 is screwed into the adjust nut 17 which is then tightly fastened. As a result of this fastening, the inclined surface 18 and the inner peripheral surface 20 firmly closely contact each other. A strong frictional force acts between the two surfaces, whereby the two members 15, 17 do not mutually relatively rotate.

In the mid-part of the shearing bolt 22, a neck part 25 having a small cross-sectional area is formed between a head part 24 for stopping tools such as a spanner, a wrench, etc. and a large-diameter part 23 for pressing the outer surface (left surface in FIGS. 3 and 4) of the seat plate 21. When a large torsional force is exerted between the large-diameter part 23 and the head part 24, shearing is effected so that this neck part 25 is cut off.

A height adjusting member of the tilt type steering system is assembled by use of the above-mentioned shearing bolt 22 in the following manner.

To start with, a lift bracket 9 is inserted into an interior of a fixed bracket 7. Slits 8, 8 of the fixed bracket 7 are matched with notches 10, 10 of the lift bracket 9. Thereafter, the adjust bolt 11 is inserted into these slits 8, 8 and the notches 10, 10. A flat part 13 of the head part 12 of this adjust bolt 11 engages with an edge of the slit 8, thus preventing a rotation of this adjust bolt 11.

Subsequently, the tip of the adjust bolt 11 is screwed into the adjust nut 17. This adjust nut 17 is tightly fastened with predetermined torque by use of a torque wrench or the like. Thereafter, the short cylindrical member 19 of the proximal end of the tilt lever 15 is externally fitted to the inclined surface 18 of the adjust nut 17. At the same time, the tilt lever 15 is rotated about this adjust nut 17, thus prescribing a direction of this tilt lever 15.

The direction of the tilt lever 15 is prescribed in this way, and simultaneously the shearing bolt 22 externally fitted with the seat plate 21 is screwed into the adjust nut 17 from its outer end opening, It is further tightly fastened, thereby strongly pressing the inner peripheral surface of the short cylindrical member 19 towards the inclined surface 18. The tilt lever 15 is fixed to the adjust nut 17.

After the shearing bolt 22 has been tightly fastened enough to fix the tilt lever 15 to the adjust nut 17, this shearing bolt is further tightly fastened. As a result, neck part 25 formed in the mid-part of the shearing bolt 22 is sheared off (see FIG. 4). The head part 24 of this shearing bolt 22 is thus removed. As a consequence of this, the shearing bolt 22 can not be removed from the adjust nut 17. It is therefore impossible to deassemble this adjust nut and the tilt lever 15.

For this reason, tilt lever 15 are decomposed and reassembled, whereby does not vary. When the tilt lever 15 is rotated up to a predetermined position, it follows that a force for clenching the lift bracket 9 does not change. It is therefore feasible to effectively prevent such situations that holding of a steering wheel becomes uncertain, or a large impact is applied to the body of a driver when a collision happens.

It will be appreciated that the fixing of the adjust nut 17 and the tilt lever 15 requires only such a process that the shearing bolt 22 is tightly fastened by a slightly strong force. This no special equipment is needed, and the operation may be easily performed.

Figure 5:
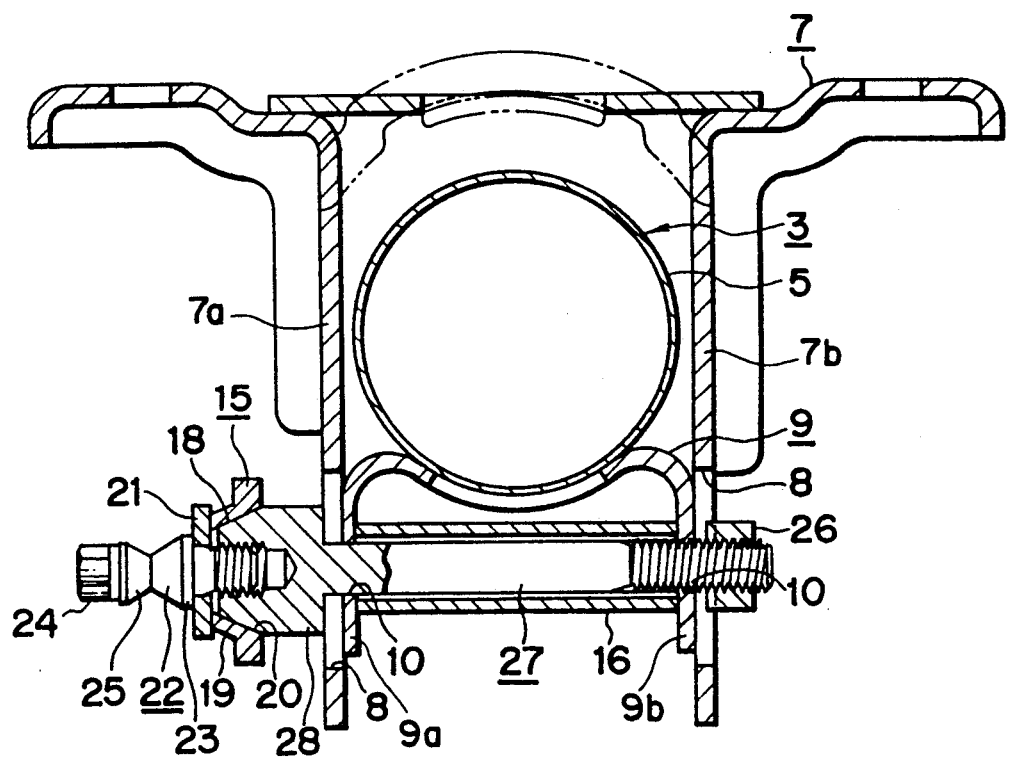
FIG. 5 is still another similar view, showing a state where the shearing of the shearing bolt is not yet performed in a second embodiment of the present invention.

Next, the second embodiment of the present invention will be demonstrated by FIG. 5. In the first embodiment discussed above, the adjust bolt 11 is incapable of rotating, and, at the same time, the adjust nut 17 is rotated by the tilt lever 15. In contrast, according to this embodiment, a rotation preventive mechanism is arranged such that a part of an adjust nut 26 engages with the slit 8 to make this adjust nut 26 impossible of rotation. Simultaneously, an adjust bolt 27 screwed into the adjust nut 26 is freely rotatable by the tilt lever 15. Then, the proximal end of the tilt lever 15 is fixed through a shearing bolt 22 to the part of the inclined surface 18 formed on a head part 28 of this adjust bolt 27.

Other constructions and operations are the same as those in the first embodiment described above, and hence the repetitive explanations will be omitted by marking the same portions with the like symbols.

The tilt type steering system according to the present invention is structured and operates as described above. Therefore, the inseparable structure can be manufactured at low costs without effecting troublesome working.

Although the illustrative embodiments of the present invention have been described in detail with reference to the accompanying drawings, it is to be understood that the present invention is not limited to those embodiments. Various changes or modifications may be effected by one skilled in the art without departing from the scope or spirit of the invention.

What is claimed is:

1. A tilt type steering system mounted to a car body, comprising:

a steering column having one end part into which a handle shaft fixed with a steering wheel is rotatably inserted;

supporting means supporting another end part of said steering column on a pivot axis such that said steering column is pivotally movable about said pivot axis relative to the car body;

adjusting means for adjustably locating and releasably fixing said steering column relative to the car body within a range of pivotal movement of said steering column, whereby a location of said steering wheel can be adjustably fixed relative to the car body; and a tilt lever for controlling fixation and release of said steering column relative to the car body by said adjusting means;

wherein said adjusting means includes a lift bracket fixed to a mid-part of said steering column and having two side portions disposed to either side of an axis of said steering column, said side portions having respective notches formed therein; a fixed bracket fixed to the car body and having side portions which slidably engage said side portions of said lift bracket during pivotal movement of said steering column and which have slits that oppose said notches of said side portions of said lift bracket over said range of pivotal movement of said steering column; an adjust bolt penetrating said notches and said slits; an adjust nut screwed to said adjust bolt and cooperable with said adjust bolt to fasten said lift bracket to said fixed bracket; a rotation preventive mechanism for preventing rotation of said adjust nut; and a shearing bolt fixing said tilt lever to said adjust bolt, a head part of said shearing bolt having been shorn off by application of a predetermined torque in the fixing of said tilt lever to said adjust bolt.

* * * * *